P. S. RYDBECK.
BALL BEARING.
APPLICATION FILED JUNE 11, 1918.
1,287,761.
Patented Dec. 17, 1918.
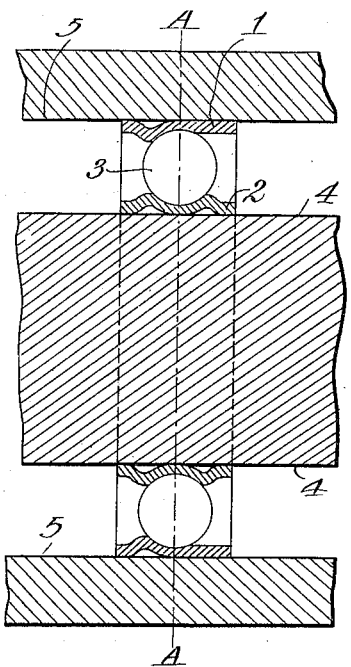
INVENTOR
*Patrik Samuel Rydbeck*
By Attorneys,

UNITED STATES PATENT OFFICE.

PATRIK SAMUEL RYDBECK, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-BEARING.

1,287,761.   Specification of Letters Patent.   Patented Dec. 17, 1918.

Application filed June 11, 1918.  Serial No. 239,390.

*To all whom it may concern:*

Be it known that I, PATRIK SAMUEL RYDBECK, a subject of the King of Sweden, residing at Gottenborg, Sweden, have invented certain new and useful Improvements in Ball-Bearings, of which the following is a specification, reference being had to the drawing accompanying and forming a part thereof.

This invention relates to ball bearings of the annular type comprising two race rings made with the greatest accuracy and having uninterrupted race-ways and balls therebetween which keep the whole together to a non-adjustable machine element. The said ball bearings, on account of their working safety and their capacity of supporting great loads, have obtained a wide use. For many purposes, however, the normal ball bearings will be too expensive, and in many cases a cheaper product may be used, for instance, for lesser demands on the loading capacity.

The object of the invention is to produce such a cheap annular ball bearing the race rings of which are made by pressing or rolling of pieces of tubes or sheet metal.

The invention consists, chiefly, in that the impressions or expressions, respectively, in the ring body forming the race grooves are arranged to bear directly on the casing and the shaft, respectively, in the plane passing through the points of contact of the balls with the said grooves. By this is gained that the load will be transmitted from the shaft through the race rings and the balls to the casing without any yielding taking place, by which the bearing capacity of the ball bearing will be substantially independent of the thickness of the ring. This thickness may, therefore, be comparatively small, and, in a bearing of predetermined dimensions, the size of the balls may thus be correspondingly increased, by which a comparatively high bearing capacity is obtained.

In the drawing, a single row radial ball bearing according to the invention is shown by way of example.

Referring to the drawing, the race rings 1 and 2 are, preferably, made of steel tubes cut off into pieces of suitable length, whereupon the race grooves are formed by pressing or rolling, said procedure being performed, if desired, under such pressure that the grooves of the rings attain a hardness sufficient for certain conditions. If a greater hardness be desired, the rings may be tempered and, preferably, the grooves treated by subsequent grinding and polishing. It is obvious that such a method is considerably cheaper than the ordinary method of turning in lathes and, besides, a considerable saving of material is obtained.

As shown in the figure, the expression forming the groove in the inner ring 2 is arranged to bear directly on the shaft 4, while the impression forming the groove in the outer ring 1 bears directly on the casing 5 in the center plane A—A containing the points of contact of the balls 3 with the said race grooves, by which the advantage is gained, as hereinbefore mentioned, that the load will be transmitted, without yielding, from the shaft 4 to the casing 5.

In order to facilitate the mounting of the bearing, the shoulder of the outer ring 1 confining the groove at one side is made lower than the corresponding shoulder at the other side. Obviously, this may as well be the case in the inner ring 2 or in both rings. The said shoulder of one of the rings may also be wholly removed so that the cylindrical inner surface of the said ring will be in axial alinement with the bottom of the groove at the center plane of the balls, by which the bearing will permit axial movements of the shaft.

The mounting of the bearing shown in the drawing is performed by first placing the balls 3 around the inner ring 2 and then pressing the outer ring 1 over the balls in making use of the elasticity of the rings.

What I claim is:—

1. A ball bearing comprising sheet metal race rings having grooves conforming to and adapted to receive the balls, and in which the portions in the ring body forming the grooves are arranged so that the rings bear directly on the casing and on the shaft, respectively, in the plane passing through the outermost points of contact of the balls with the said grooves.

2. A ball bearing consisting of sheet metal race rings having ball recesses conforming to and adapted to receive balls and so arranged that the balls make contact at their outermost points with the adjacent surfaces of the race rings in a plane which passes through the points of contact between the outer surfaces of the race rings and an axle and housing, respectively.

In testimony whereof I affix my signature.

PATRIK SAMUEL RYDBECK.